No. 653,662. Patented July 17, 1900.
C. F. CREAMER.
MEANS FOR SECURING CATTLE.
(Application filed Nov. 4, 1899.)
(No Model.)
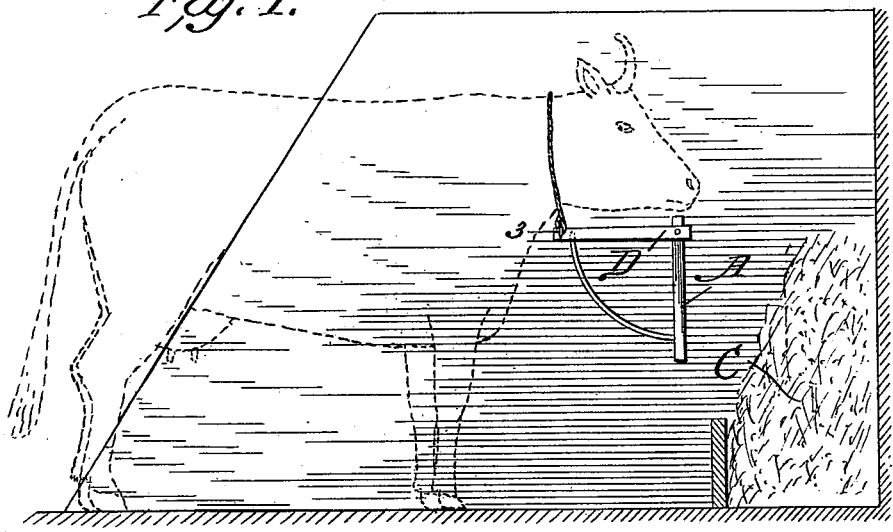
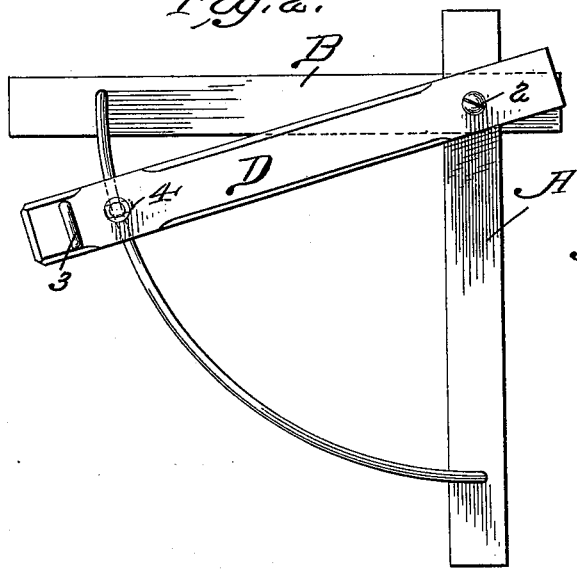
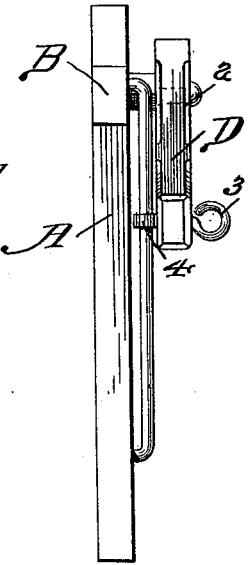
Attest
[signature]
L. B. Middleton
Inventor
Cyrus F. Creamer,
by [signature]
Atty.

UNITED STATES PATENT OFFICE.

CYRUS F. CREAMER, OF GLENDEN, MAINE.

MEANS FOR SECURING CATTLE.

SPECIFICATION forming part of Letters Patent No. 653,662, dated July 17, 1900.

Application filed November 4, 1899. Serial No. 735,821. (No model.)

*To all whom it may concern:*

Be it known that I, CYRUS F. CREAMER, a citizen of the United States, residing at Glenden, Maine, have invented certain new and useful Improvements in Means for Securing Cattle, of which the following is a specification.

My invention relates to means for securing cattle in their stalls. It is designed to cause the animal to shift its position forward and backward in lying down and getting up or in raising or lowering its head, as hereinafter explained.

The principal object is to cause the animal to occupy a position in the stall more to the rear when standing and more to the front when lying down. This, especially with cows, is desirable for purposes of cleanliness, as will be readily understood by those having the care of such animals; but the invention as arranged by me in its relation to the feed box or rack serves also to prevent the animal from scattering the hay and tramping it under foot.

My invention consists, essentially, in a pivoted arm arranged to swing vertically on the side of the stall and having means for connecting with the halter of the animal, the arm being arranged to occupy a horizontal or approximately-horizontal position with its free end to the rear when the animal is standing and a vertical or approximately-vertical position with its free end downward when the animal is lying down.

My said invention is illustrated in the accompanying drawings, in which—

Figure 1 shows the device in side elevation in position in the stall and with the arm horizontal. Fig. 2 shows the same view of the device separate and with the arm partly down. Fig. 3 shows an edge view.

I have illustrated the device as it is practically used and as I have found it convenient for construction and application to the stall. In this form it may be made complete and applied by any unskilled person; but I do not limit myself to the frame nor special means shown for holding the swinging arm. In the drawings, A shows a vertical and B a horizontal bar, secured together at the angle and fixed in place with the vertical bar about on a line with the rear board of the feed box or crib C. The frame composed of these bars is provided with a rod of iron or other suitable material curved on the segment of a circle struck from the pivot 2 as a center. The ends of the rod are bent inward and fixed in the ends of the horizontal and vertical arms of the frame, so that the rod is set off slightly from the outer face of the frame. The swinging arm D is pivoted at 2 and is provided at its free end with an eye 3, to which the halter of the animal may be attached. An eyebolt 4 also connects the free end of this arm to the curved rod, so that the arm is always held to the rod in all positions which it may assume in swinging. The offset of the rod allows the eyebolt to move through the entire curve.

Suppose now that the animal is secured to the rear end of this swinging arm, the front end of which is pivoted, as above explained, about in line with the rear edge of the crib and at about the height of the animal's halter connection above it. It will be plain that when the animal rises the arm will swing upward and will push the animal secured to its free end to the rear. On the other hand, in lying down the arm will be swung downward and the free end carried forward its own length and the animal thus drawn forward that distance from the standing position. Thus it is impossible for the animal to lie down in its own droppings, and it is thus easily kept clean.

The frame and curved rod merely serve to hold the arm in position as it swings or remains in position, and I do not limit myself to these precise forms of retaining devices for the arm, although I claim them best.

I claim—

1. In combination, the arm pivoted at or near the forward part of the stall and arranged to swing rearward in a vertical plane from a vertical to a horizontal position, and a guide adjacent to the free end of said arm, substantially as described.

2. In a hitching attachment for stalls and the like, a frame comprising two bars secured together at an angle to each other, a guide connecting the free ends of said bars and an arm pivoted to said frame at the angle thereof and guided by said guide, substantially as described.

3. In combination, the frame comprising the bars A and B secured together at an angle, a curved guide-rod connecting the free ends of said bars, an arm pivoted to said frame, and an eye carried by said bar and engaging said guide, substantially as described.

4. In combination, the frame comprising the bars A and B united at an angle, a curved rod extending between the free ends of said bars and offset therefrom, and a swinging arm pivoted to said frame and having an eye engaging said rod, substantially as described.

In testimony whereof I affix my signature in presence of two witnesses.

CYRUS F. CREAMER.

Witnesses:
 LUCINDA F. CREAMER,
 NINA E. CREAMER.